United States Patent
Keronen et al.

(10) Patent No.: US 6,567,530 B1
(45) Date of Patent: May 20, 2003

(54) DEVICE AND METHOD FOR AUTHENTICATING AND CERTIFYING PRINTED DOCUMENTS

(75) Inventors: Seppo Reino Keronen, Eastwood (AU); Stamatios Demetriou, Beecroft (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/197,472

(22) Filed: Nov. 23, 1998

(30) Foreign Application Priority Data

Nov. 25, 1997 (AU) .............................................. PP0535

(51) Int. Cl.[7] .............................................. G06K 9/00
(52) U.S. Cl. ...................................... 382/100; 713/176
(58) Field of Search ........................... 380/246, 51, 54; 382/100; 235/380; 399/367

(56) References Cited

U.S. PATENT DOCUMENTS

| | | | | |
|---|---|---|---|---|
| H21 H | * | 2/1986 | Schieck ...................... 399/367 |
| 4,810,862 A | * | 3/1989 | Nakano et al. .............. 235/380 |
| 4,868,877 A | * | 9/1989 | Fisher ......................... 380/25 |
| 5,027,395 A | | 6/1991 | Anderson et al. .............. 380/4 |
| 5,133,024 A | | 7/1992 | Foessl ......................... 382/41 |
| 5,157,726 A | * | 10/1992 | Merkle et al. ................ 380/23 |
| 5,506,697 A | * | 4/1996 | Li et al. ..................... 358/448 |
| 5,544,045 A | | 8/1996 | Garland et al. ........ 364/419.03 |
| 5,692,048 A | * | 11/1997 | Gormish et al. .............. 380/18 |
| 5,793,871 A | * | 8/1998 | Jackson ....................... 380/54 |
| 5,923,763 A | * | 7/1999 | Walker et al. ................ 380/51 |

FOREIGN PATENT DOCUMENTS

EP 0629972 12/1994

OTHER PUBLICATIONS

W. Wesley Peterson and E.J. Weldon Jr., "Error Correcting Codes," Second Edition, Sixth printing, Jul. 1981, The Massachusetts Institute of Technology, printed by Halliday Lithograph Corporation, pp. 131–136.

* cited by examiner

Primary Examiner—Bhavesh Mehta
Assistant Examiner—Abolfazl Tabatabai
(74) Attorney, Agent, or Firm—Fitzpatrick, Cella, Harper & Scinto (57) ABSTRACT

A certifier device (90) for producing a certified document (101) of an original document (100) and a verifier device (300) for verifying the certified document (101). The certifier device (90) includes a scanner (102) for scanning the original document (100) to generate a true copy image. The certifier has also an encoder (104) for computing a digital code which is representative of the true copy image; an encryptor (108) for encrypting the digital code according to a private key associated with a certifier identification; and a compositor (107) for compositing an image including the true copy image together with the encrypted digital code and certifier identification. The verifier device (300) includes a scanner (301) for scanning the certified document (101); a decryptor (307) for decrypting the encrypted digital code according to a public key associated with the certifier identification; and an encoder (309) for computing a digital code which is representative of the true copy image. The verifier (300) also has a comparator (308) for comparing the digital code supplied by said encoder (309) and said decrypted digital code supplied by said decryptor (307); wherein a match of the digital codes indicates the certified document is authentic and a mismatch indicates the document is not authentic.

18 Claims, 6 Drawing Sheets

DEVICE AND METHOD FOR AUTHENTICATING AND CERTIFYING PRINTED DOCUMENTS

TECHNICAL FIELD

This invention relates to a method and device for the authentication and certification of documents.

BACKGROUND OF THE INVENTION

Some printed documents such as birth certificates, academic records, bonds, legal documents amongst others are sometimes altered as part of an illegal activity.

A method of authenticating printed documents is disclosed in U.S. Pat. No. 5,544,045. This U.S. patent discloses an authenticating scheme whereby an original document is scanned and then encoded according to a predetermined coding algorithm into a unique digital code, which is then printed as a bar code together with the original image on a new document. Authentication of the new document is achieved by scanning the new document to produce a new code and then comparing the new code with the printed code on the new document. A match indicates the new document is an authentic copy of the original. A mismatch indicates the document has been altered and is not authentic.

The above method suffers from the disadvantage that persons may circumvent the method by obtaining the coding algorithm, altering the image, then encoding the altered image to obtain a new code and replacing the old printed code with the new code.

SUMMARY OF THE INVENTION

According to one aspect of the invention, there is provided a certifier device for producing a certified document of an original document, the certifier device including: scanning means for scanning the original document to generate a true copy image of the original document; encoding means for computing a digital code which is representative of the true copy image; encryption means for encrypting the digital code according to a private key associated with a certifier identification; compositing means for compositing an image including the true copy image together with the encrypted digital code and certifier identification.

According to another aspect of the invention, there is provided a certified document including; a true copy image of an original document; a certifier identification; an encrypted digital code, wherein the encrypted digital code is representative of the true copy image and which has been encrypted by a private key associated with the certifier identification.

According to another aspect of the invention, there is provided a verifier device for verifying a certified document, the certified document including a true copy image of an original document; a certifier identification; an encrypted digital code, wherein the digital code is representative of the true copy image and which has been encrypted by a private key associated with the certifier identification, the verifier device including: scanning means for scanning the certified document; decryption means for decrypting the encrypted digital code according to a public key associated with the certifier identification; encoding means for computing a digital code which is representative of the true copy image; and comparator means for comparing the digital code supplied by said encoding means and said decrypted digital code supplied by said decryption means; wherein a match of the digital codes indicates the certified document is authentic and a mismatch indicates the document is not authentic.

According to another aspect of the invention, there is provided a method of producing a certified document of an original document, said method including the steps of; scanning the original document to generate a true copy image of the original document: computing a digital code which is representative of the true copy image; encrypting the digital code according to a private key associated with a certified identification; and compositing an image including the true copy image together with the encrypted digital code and certifier identification.

According to another aspect of the invention, there is provided a method of verifying a certified document, the certified document including; a true copy image of an original document; a certifier identification; an encrypted digital code, wherein the digital code is representative of the true copy image and which has been encrypted by a private key associated with the certifier identification, said method including the steps of: scanning the certified document; decrypting the encrypted digital code according to a public key associated with the certifier identification; computing a digital code which is representative of the true copy image; and comparing the said decrypted digital code and said computed digital code: wherein a match of the digital codes indicates the certified document is authentic and a mismatch indicates the document is not authentic.

BRIEF DESCRIPTION OF THE DRAWINGS

A number of embodiments of the invention are described below by way of example only, with reference to the accompanying drawings, in which.

DESCRIPTION OF PREFERRED EMBODIMENTS

Figure 1:
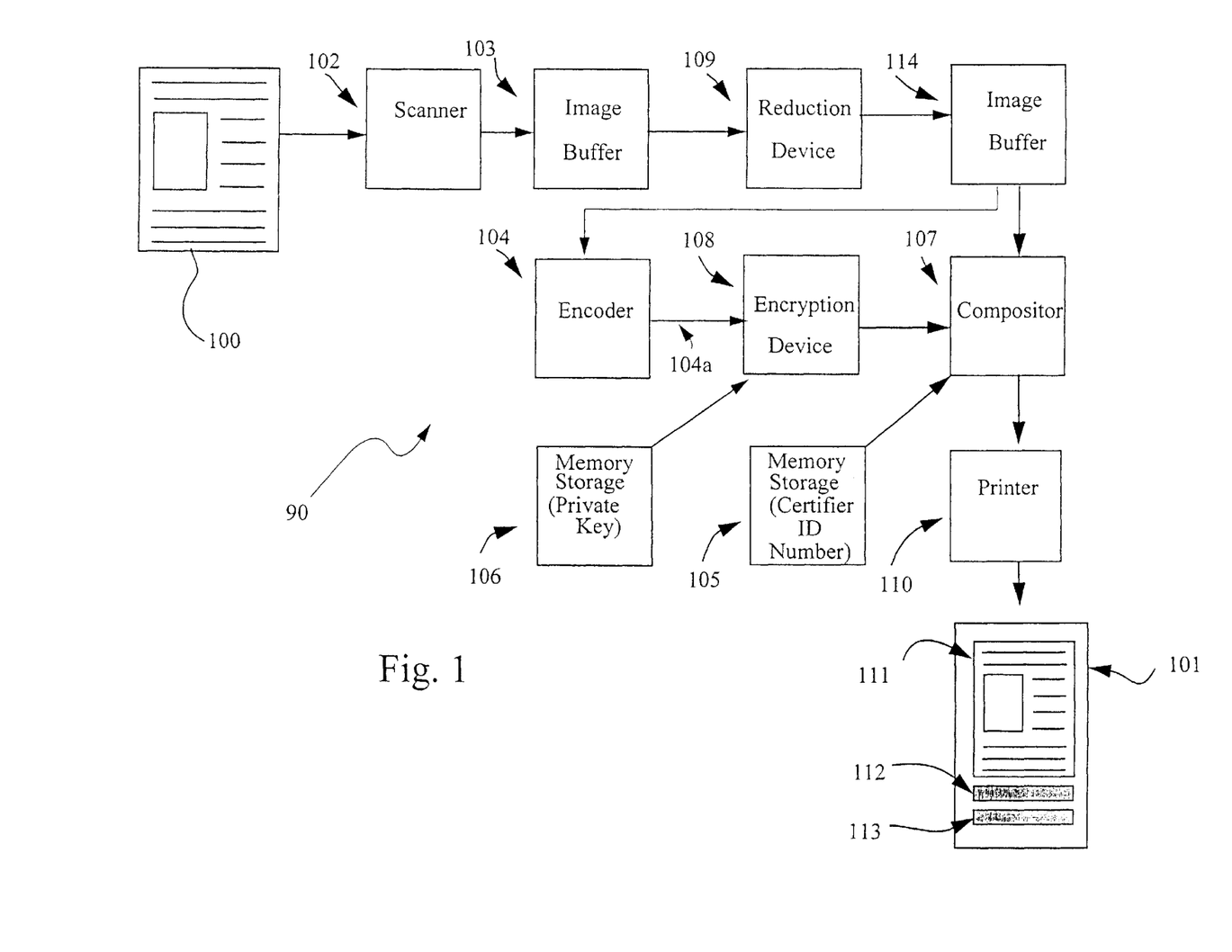
FIG. 1 is a schematic block diagram of a certifier device in accordance with a preferred embodiment of the invention.

FIG. 1 is a schematic block diagram of a certifier device 90 for producing a certified document 101 from an original document 100. An optical scanner 102 converts written, printed, digital, and/or graphical information that appears on the printed original document 100 into a digital image, and stores this information in an image buffer 103. A reduction device 109 reduces the size of the image data stored in image buffer 103, which is then supplied to an image buffer 114. The image data stored in the buffer 114 corresponding to the original image 100 is then encoded according to a predetermined algorithm by an encoder 104, so as to compute a digital signature 104a which is representative of the image of the original document 100. This digital signature 104a is fed by the encoder 104 to an encryption device 108, which then encrypts the digital signature 104a using a known public key cryptographic method. The encrypted digital signature is then fed by the encoder 108 to an image compositor 107.

Figure 2:
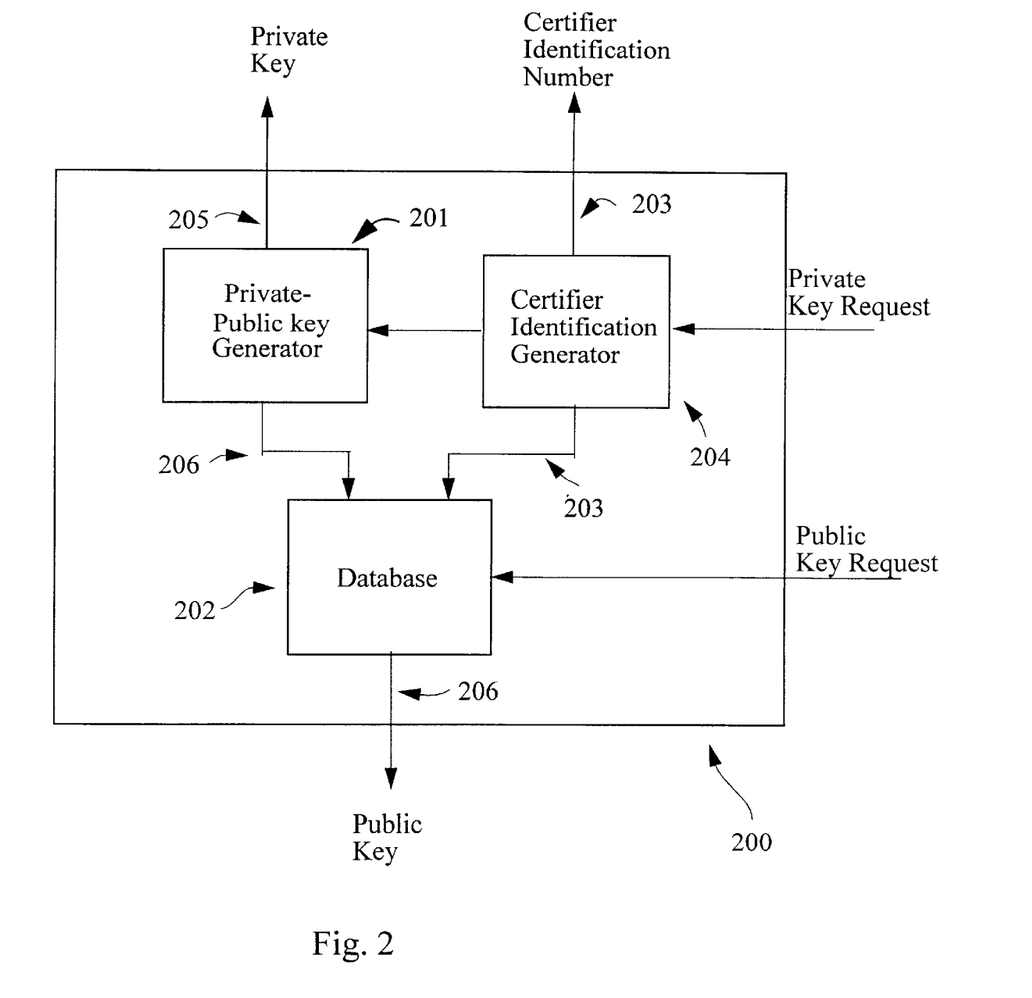
FIG. 2 is a schematic block diagram of a trusted central authority in accordance with a preferred embodiment of the invention.

The encryption device 108 encrypts the digital signature 104a using a private key allocated by a trusted central authority 200 shown in FIG. 2. This trusted central authority 200 also issues a certifier identification number associated with the private key for use by the certifier device. The associated private key and certifier identification number may be input by a user via a keyboard (not shown) or stored in memory storage 106 and 105 (respectively) for subsequent supply to the encryption device 108 and the image compositor 107 respectively. The image compositor 107 composites the associated encrypted digital signature, certifier identification number and reduced copy of the original image to form a composited image. The compositor 107 supplies the composited image to a printer 110, which prints the certified document 101.

Preferably, the printed certified document 101 includes a reduced true copy of the original image 100 in a first section 111, the certifier identification number in the form of a bar code in a second section 112 and the encrypted digital signature in the form of another bar code in a third section 113. Such bar codes may be visible to the naked eye or utilise infra red printing techniques. Alternatively, when printing the certified document 101, the encrypted digital signature and certifier identification number may be embedded in the true copy of the original image itself either locally or distributed over the entire document. In the later case, there is no need to reduce the original image and thus the reduction device 109 may be omitted. Also some text may be printed on the certified document 101 such as "digitally signed", or be part of predesigned paper used for printing of "digitally signed documents". Such text may be visible or concealed.

The certifier device 90 shown in FIG. 1 can be implemented using dedicated hardware or alternatively by a standard personal computer having as peripheral devices an optical scanner 102 and printer 110. In this particular embodiment, the computer performs the functions of the other devices shown in FIG. 1.

FIG. 2 shows a schematic block diagram of a trusted central authority 200. When a private key request is received by the Certifier Identification Generator 204, the trusted central authority 200 issues a certifier identification number 203 to a party intending to use a certifier device 90 as shown in FIG. 1. The trusted central authority also generates by means of a private-public key generator 201 a public, private key pair (205,206) according to a known key generation method for public key encryption. The certifier identification number 203 and associated generated private key 205 are then supplied by the trusted central authority 200 to the intended certifier. It is desirable that when supplying the private key 205 to the intended certifier that this is done by secure means (eg. embedded in a manufactured device). The public key 206 together with its associated certifier identification number 203 and certifier's name are also stored by the trusted central authority 200 in a database 202 which are accessible by and supplied to the public upon request, for example by way of modem or other means.

Figure 3:
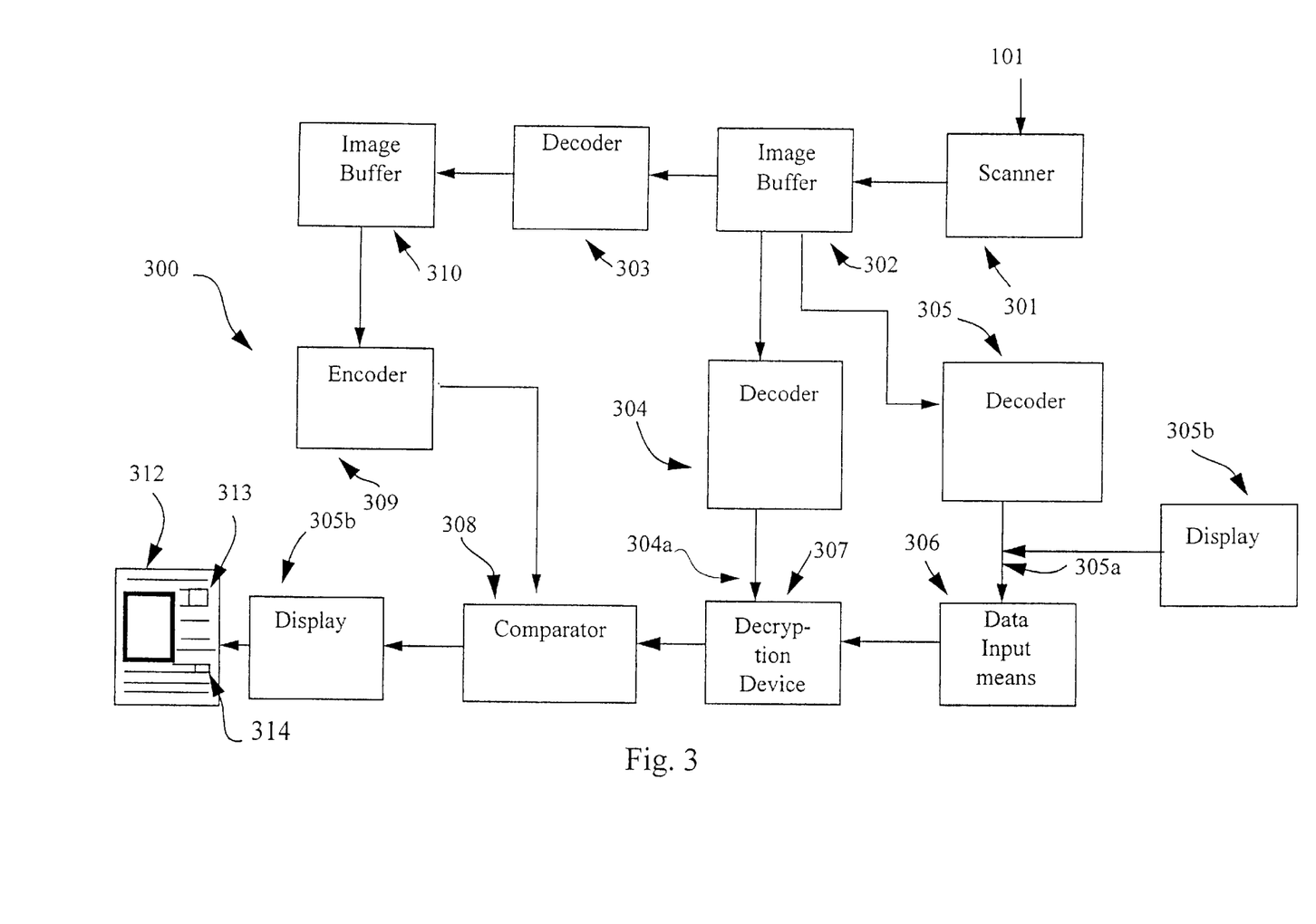
FIG. 3 is a schematic block diagram of a verifier device in accordance with a preferred embodiment of the invention.

FIG. 3 shows a schematic block diagram of a verifier device 300 for authenticating certified documents 101 of the type produced by a certifier device 90 shown in FIG. 1. The verifier device 300 shown in FIG. 3 may be part of a photocopier having an optical scanner 301, input means 306 and a microprocessor (not shown) for performing the functions of the other components shown in FIG. 3. Alternatively, the verifier device 300 may take the form of a computer having as peripheral devices the optical scanner 301, display 305b and data input means 306. The purpose of the verifier device 300 is to establish that a certified document 101 of the type shown in FIG. 1 comes from a duly certified source and has not been altered since certification.

The verifier device 300 shown in FIG. 3 has an optical scanner 301 for scanning the certified document 101 and storing the digital image of the certified document 101 into an image buffer 302. A decoder 305 reads the stored digital image in the buffer 302 and extracts the certifier identification number 305a from the bar code in the second section 112 of the certified document 101. The verifier 300 also has a decoder 304 that reads the stored digital image in the buffer 302 and extracts the encrypted digital signature 304a from the bar code in the third section 113 of the certified document 101. The verifier device 300 has in addition to the decoders 304 and 305, a decoder 303 that reads the digital image stored in the image buffer 302 and extracts the true copy of the original image in the first section 111 of the certified document 101. The decoder 303 then stores this true copy image in an image buffer 310. The decoders 303, 304 and 305 are able to extract their respective parts of the image (viz., sections 111, 112 and 113 of FIG. 1) for processing by detecting machine readable markings in the margins of the certified document 101. Alternatively, the sections 111, 112 and 113 of the certified document 101 may be located in predetermined areas and the decoders 303, 304 and 305 extract these predetermined areas of the image.

The decoder 305 supplies the extracted certifier identification number to a display 305b for visual reproduction to an operator. The operator can then contact the trusted central authority 200 shown in FIG. 2 with the displayed certifier identification number who supplies the operator with the certifier's name and public key associated with that certifier identification number from their database 202. The operator then enters the public key via data input means 306. In another embodiment, the decoder 305 may directly access the trusted central authority database 202 via modem and automatically receive the certifier's name and public key associated with the certifier identification number. In this embodiment, the certifier name is then displayed in display 305b. The public key associated with the certifier identification number is then supplied to the decryption device 307. The decryption device 307 decrypts the encrypted digital signature 304a supplied by the decoder 304 using the public key associated with the certifier identification number.

The verifier device 300 has an encoder 309 for encoding the true copy image data stored in the image buffer 310 using the same predetermined coding algorithm used in encoder 104 of the certifier device shown in FIG. 1. A comparator 308 then compares the digital signature supplied by the encoder 309 and the digital signature supplied by the decryption device 307. If the comparator 308 determines the digital signatures are the same then it outputs to the display 305b to inform the operator that the certified document has not been altered and comes from a verified source. If the comparator 308 determines that the digital signatures are not the same then it outputs to the display 305b to inform the operator that the certified document has been altered and/or does not come from a verified source. Preferably the verifier device prints a copy of the certified document 312 showing the areas where the certified document has been altered, for example at locations 313 and 314 seen in FIG. 3.

In the verifier device 300, the true copy image is preferably passed through a low pass filter (not shown) prior to the computation of the digital signature by the encoder 309. The purpose of the low pass filter is to reject high frequency noise which may have resulted from imperfections such as dust, scratches, pin holes, creases etc. in or on the certified document 101. This prevents the verifier device from wrongly indicating a document is not authentic due to such minor imperfections.

Whilst persons may be able to obtain the public key, certifier identification number and even the predetermined coding algorithm, it will be extremely difficult for those persons to illegally alter the certified document 101 without the private key. Only the certifier keeps the private key, the trusted central authority need only keep a copy of the certifier identification number, the certifier's name and the associated public key.

The inclusion of the certification number provides for certification that the document comes from a particular source. The verifier device 300 uses the certification number to obtain the certifier's name and the public key from the trusted authority. The user is then able to compare the certifier's name with the information contained in the document to check the certification. This also allows the trusted central authority 200 to deny the certifier at any time by refusing to issue the public key. This might be necessary if the certifier device is stolen or otherwise misused. Preferably, the date and time of certification is included with the certification identification number. In this case, it would be possible to state that only documents certified prior to misuse should be trusted. The inclusion of the certifier identification number also prevents a third party from using a certifier device and certifying documents as coming from another certifier device. In a further modification, the certified document, instead of having a certification identification number printed thereon, has a public key together with a digital certificate printed thereon. The digital certificate is obtained from another authority, higher than the trusted central authority, authenticating the source of the public key.

In the preferred embodiment, the public key cryptographic method utilises the well known RSA algorithm. In the RSA algorithm, digital data is encrypted using two prime numbers which are multiplied together, as is well known in the art. In the case where each of the two prime numbers has approximately 200 digits, the RSA algorithm offers a very secure encryption method.

In the preferred embodiment, the above mentioned predetermined coding algorithm for obtaining the digital signature from the original image utilises an image coding algorithm together with error detection coding techniques. The original image of document 100 (see FIG. 4A) is segmented into m rows and n columns of small squared sized images. Each image segment is digitally encoded in accordance with an image coding algorithm, such as a grey scale, to produce a digital representation of each image segment. A two-dimensional error detecting block code (m,k)×(n,k') is then used for encoding the digital representations of the image segments. The digital representations of the image segments forming the information symbols of the block code. The parity check symbols of all the rows and columns are combined to form the digital signature which is representative of the original image 100. In particular, the digital signature can include the following sequence of parity check symbols $CRC_{r=1}$, $CRC_{r=2}$ . . . $CRC_{r=m}$, $CRC_{c=1}$ . . . $CRC_{c=n}$, $CRC_{CRC}$, where $CRC_{r=j}$ are the parity check symbols for the jth row, $CRC_{c=i}$ are the parity check symbols for the ith column and $CRC_{CRC}$ are the parity check symbols on the parity check symbols. The digital signature is then encrypted and encoded as a bar code for printing on the certified document 101 (FIG. 4B). This has the advantage that when the comparator 308 of the verifier device 300 detects that the digital signature of the original image 100 and the digital signature of the true copy image 111 of the certified document 101 are not the same, then further processing means is able to determine the specified areas of alteration. How this is achieved is explained with reference to FIGS. 4A and 4B.

Figure 4A:
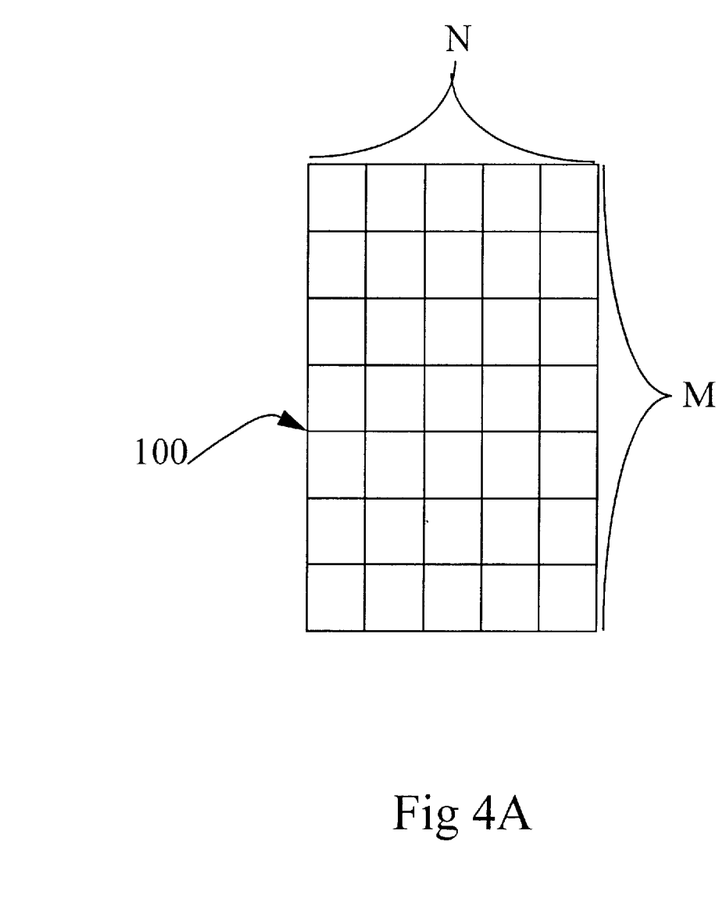
FIGS. 4A and 4B show an original document to be authenticated and a certified document in accordance with a preferred embodiment of the invention.
Figure 4B:
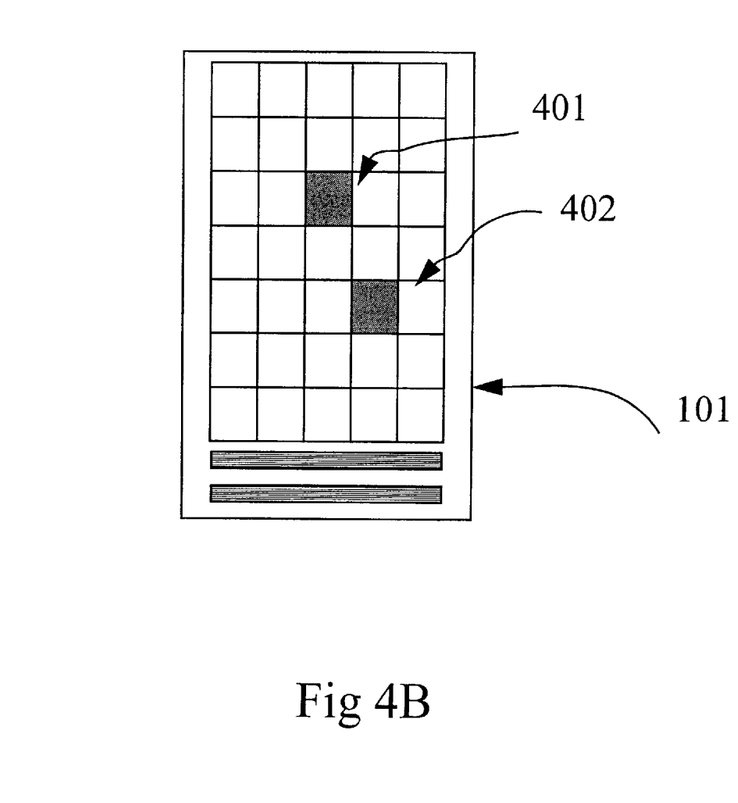

FIG. 4A shows an original document 100 to be certified. The original image of document 100 is segmented into m rows and n columns of small sized image squares and parity symbols are computed using a two dimensional block code. FIG. 4B shows a "certified document" of FIG. 4A in which two areas (401 and 402) of the true copy image have been altered. When the certified document 101 of FIG. 4B undergoes the verification process by the verifier shown in FIG. 3, the rows and columns containing the areas of tampering 401 and 402, when encoded by encoder 309 in accordance with the two-dimensional error detecting block code, will result in different parity check symbols than the parity check symbols for the same rows and columns supplied by the decryption device 307. The comparator 308 when comparing the digital signature supplied by the encoder 309 and the digital signature supplied by the decryption device 307 determines which parity check symbols are not the same. Those parity check symbols corresponding to a particular row and column which are not the same, indicate the areas of tampering. Namely those area(s) where these row(s) and column(s) cross are the tampered areas 401 and 402.

In another embodiment, separate parity symbols may be computed for each image segment. The parity symbols may be based on image coding algorithms, such as DCT or wavelet algorithm. The high frequency coefficients resulting from these algorithms can then be ignored to suppress noise. In a still further embodiment the image segments can overlap or have non-rectangular shapes to optimize the ability to efficiently code parity symbols or locate tampering.

In another embodiment, small differences between the digital signature supplied by the encoder 309 and the digital signature supplied by the decryption device 207 may be tolerated. This may be achieved by summing the differences and feeding the result to a threshold detector. If the sum falls below a predetermined threshold, the verifier outputs that the document has not been altered and/or does not come a verified source. If the sum exceeds the threshold the verifier outputs that the document is not authentic in the manner described above.

Figure 5:
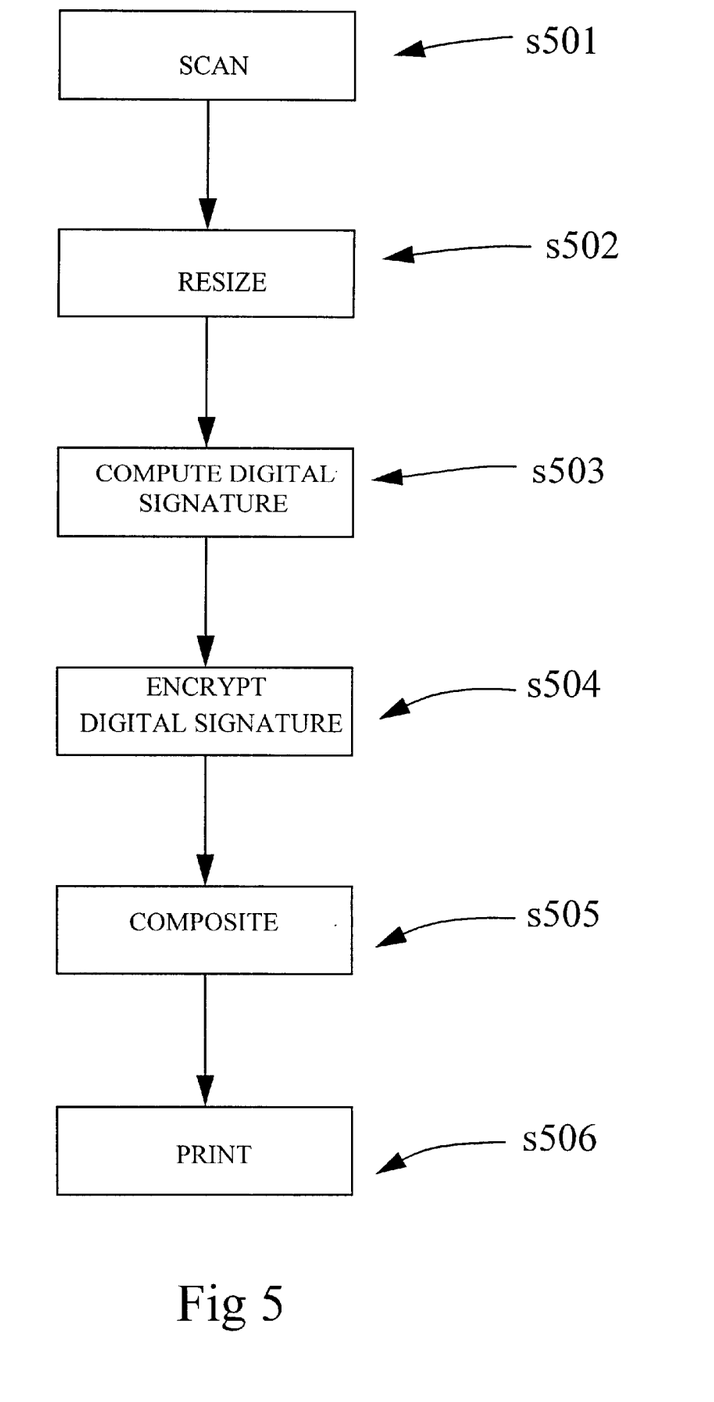
FIG. 5 shows a method of certifying a document in accordance with a preferred embodiment of the invention.

FIG. 5 shows a schematic block diagram outlining the steps of a method for certifying a printed document. In the first step S501, an original document such as the original document 100 shown in FIG. 1 is scanned and the text and/or graphics that appears on the original document 100 is stored as image data. In the step S502, the stored image data is resized downwards. The resized image data is then encoded in the next step S503 according to a predetermined algorithm (such as described previously), so as to compute a digital signature representative of the image of the original document. The digital signature is then encrypted in the next step S504 by a public key cryptographic method utilising a private key. The method in step S505 then composites the reduced image, the encrypted digital signature and a certification identification number associated with the certifier. This composited image is then printed in step S506 to produce a certified document, such as the certified document 101 shown in FIG. 1.

Figure 6:
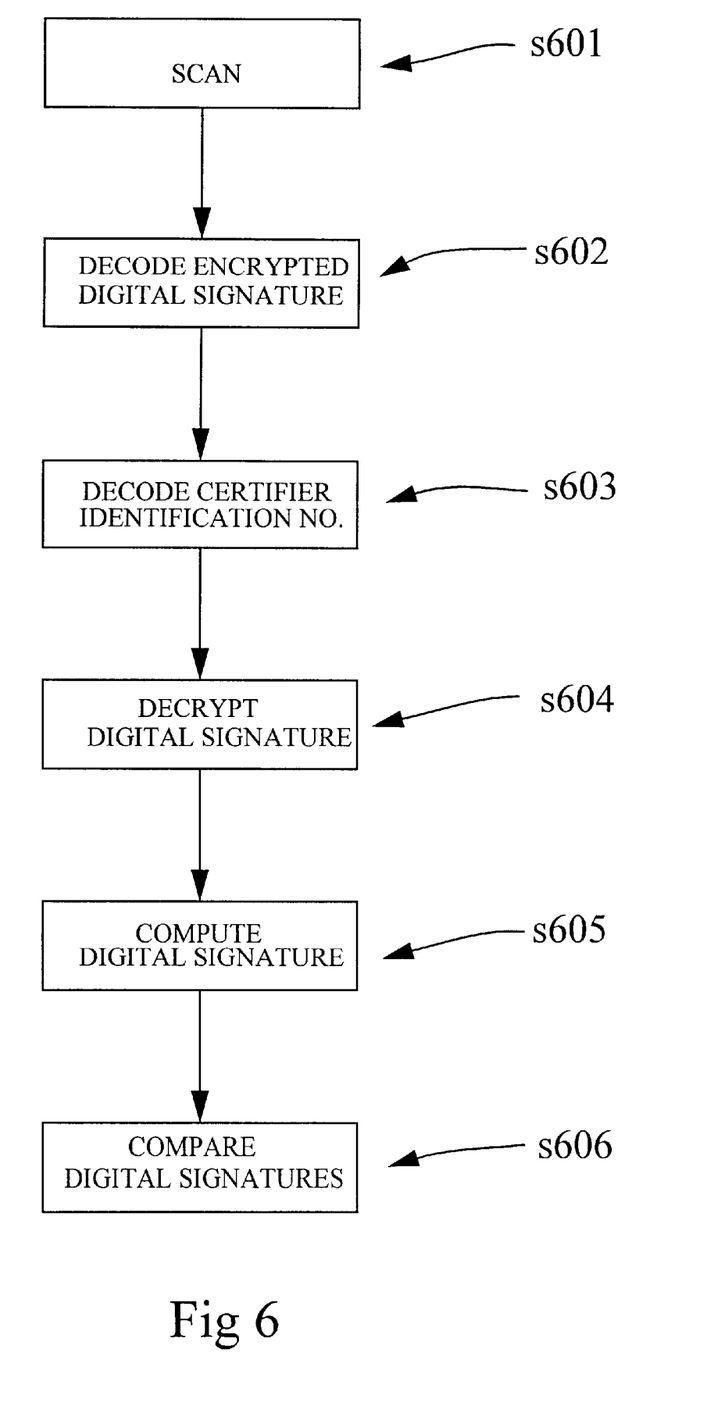
FIG. 6 shows a method of verifying a certified document in accordance with a preferred embodiment of the invention.

FIG. 6 shows a schematic block diagram outlining the steps of a method for verifying a certified document. In the first step S601 a certified document, such as certified document 101 shown in FIG. 1, is scanned and the true copy image shown in the first section 111 is extracted and stored as digital data. In the next step S602, the encrypted digital signature in the third section 113 of certified document 101 is extracted. Similarly, in the next step S603 the certifier identification number is extracted. The encrypted digital signature is then decrypted in step S604 using a public key associated with the certifier identification number obtained from step S603. In step S605 the image data extracted from step S601 is then encoded according to a predetermined algorithm (such as described previously), so as to compute a digital signature representative of the true copy image of the certified document. The method then compares in step S606 the digital signature computated by step S605 with the digital signature decrypted by step S604. If the compared digital signatures are not the same the method outputs that the certified document has been altered and/or does not come from a verified source. If they are the same the method outputs that the certified document has not been altered and comes from a verified source.

The foregoing describes a number of embodiments of the present invention and further modifications, obvious to those skilled in the art can be made thereto without departing from the scope of the present invention.

What is claimed is:

1. A certifier device for producing a certified document of an original document, the certifier device comprising:
   a scanner for scanning the original document to generate a true copy image of the original document;
   an encoder for computing a digital code from said true copy of the original document in accordance with a two dimensional error detecting block code, wherein parts of the digital code are associated with corresponding portions of the true copy image;
   an encryption device for encrypting the digital code according to a private key associated with a certifier identification; and
   a compositor for compositing an image including the true copy image together with the encrypted digital code and certifier identification.

2. A certifier device as claimed in claim 1, wherein said encoder computes the digital code in accordance with a grey scale.

3. A certifier device as claimed in claim 1, wherein said encryption device computes the encrypted digital code in accordance with a RSA algorithm.

4. A certifier device as claimed in claim 1, wherein the certifier device further comprises a printer for printing the composited true copy image together with the encrypted digital code and certifier identification.

5. The certifier device as claimed in claim 1, wherein the certifier identification includes a certifier identification number.

6. A certifier device as claimed in claim 1, wherein the certifier device further comprises a reduction device for reducing a size of the true copy image of the original document and wherein said encoder computes said digital code using said reduced true copy image.

7. A certifier device as claimed in claim 6, wherein the composited image comprises the reduced true copy image in a first section, the encrypted digital code in a second section and the certifier identification in a third section of the composited image.

8. A certified document comprising;
   a true copy image of an original document;
   a certifier identification; and
   an encrypted digital code, wherein the encrypted digital code is a result of encryption of a digital code by a private key associated with the certifier identification and said digital code is a result of coding said true copy of the original document in accordance with a two dimensional error detecting block code, wherein parts of the digital code are associated with corresponding portions of the true copy image.

9. A certified document as claimed in claim 8, wherein the digital code has been coded in accordance with a grey scale.

10. A certified document as claimed in claim 8, wherein the encrypted digital code has been encrypted in accordance with a RSA algorithm.

11. A certified document as claimed in claim 8, wherein the true copy image is a reduced image of the original document.

12. A certified document as claimed in claim 11, wherein the certified document comprises the reduced true copy image in a first section, the encrypted digital code in a second section, and the certifier identification in a third section of the certified document.

13. A verifier device for verifying a certified document, the certified document comprising:
   a true copy image of an original document;
   a certifier identification; and
   an encrypted digital code, wherein the encrypted digital code is a result of encryption of a digital code by a private key associated with the certifier identification and said digital code is a result of coding said true copy of the original document in accordance with a two dimensional error detecting block code, wherein parts of the digital code are associated with corresponding portions of the true copy image, the verifier device comprising:
   a scanner for scanning the certified document;
   a decryption device for decrypting the encrypted digital code according to a public key associated with the certifier identification;
   an encoder for computing a digital code from said true copy of the original document in accordance with said two dimensional error detecting block code, wherein parts of the digital code are associated with corresponding portions of the true copy images; and
   a comparator for comparing the digital code supplied by said encoder and said decrypted digital code supplied by said decryption device,
   wherein a match of the digital codes indicates the certified document is authentic and a mismatch indicates the certified document is not authentic, and wherein those parts of the digital codes that do not match indicates those portions of the certified document which are not authentic.

14. A verifier device as claimed in claim 13, wherein said encoder computes the digital code in accordance with a grey scale.

15. A verifier device as claimed in claim 13, wherein said decryption device decrypts the encrypted digital code in accordance with a RSA algorithm.

16. A verifier device as claimed in claim 13, wherein the verifier device further comprises a display for showing where any mismatch between the certified document and the original document may occur.

17. A method of producing a certified document of an original document, said method comprising the steps of:

scanning the original document to generate a true copy image of the original document;

computing a digital code from said true copy of the original document in accordance with a two dimensional error detecting block code, wherein parts of the digital code are associated with corresponding portions of the true copy image;

encrypting the digital code according to a private key associated with a certifier identification; and compositing an image including the true copy image together with the encrypted digital code and the certifier identification.

18. A method of verifying a certified document, the certified document comprising:

a true copy image of an original document;

a certifier identification; and an encrypted digital code, wherein the digital code is a result of encryption of a digital code by a private key associated with the certifier identification and said digital code is a result of coding said true copy of the original document in accordance with a two dimensional error detecting block code, wherein parts of the digital code are associated with corresponding portions of the true copy image, said method comprising the steps of:

scanning the certified document;

decrypting the encrypted digital code according to a public key associated with the certifier identification;

computing a digital code from said true copy of the original document in accordance with said two dimensional error detecting block code, wherein parts of the digital code are associated with corresponding portions of the true copy image; and comparing said decrypted digital code and said computed digital code, wherein a match of the digital codes indicates the certified document is authentic and a mismatch indicates the certified document is not authentic, and wherein those parts of the digital codes that do not match indicates those portions of the certified document which are not authentic.

* * * * *